C. H. PEEK.
POTATO PLANTER.
APPLICATION FILED FEB. 12, 1913.

1,065,622.

Patented June 24, 1913.
2 SHEETS—SHEET 1.

Witnesses:

Inventor
Alfred H. Peek
by Wilhelm, Parker & Hair
Attorneys.

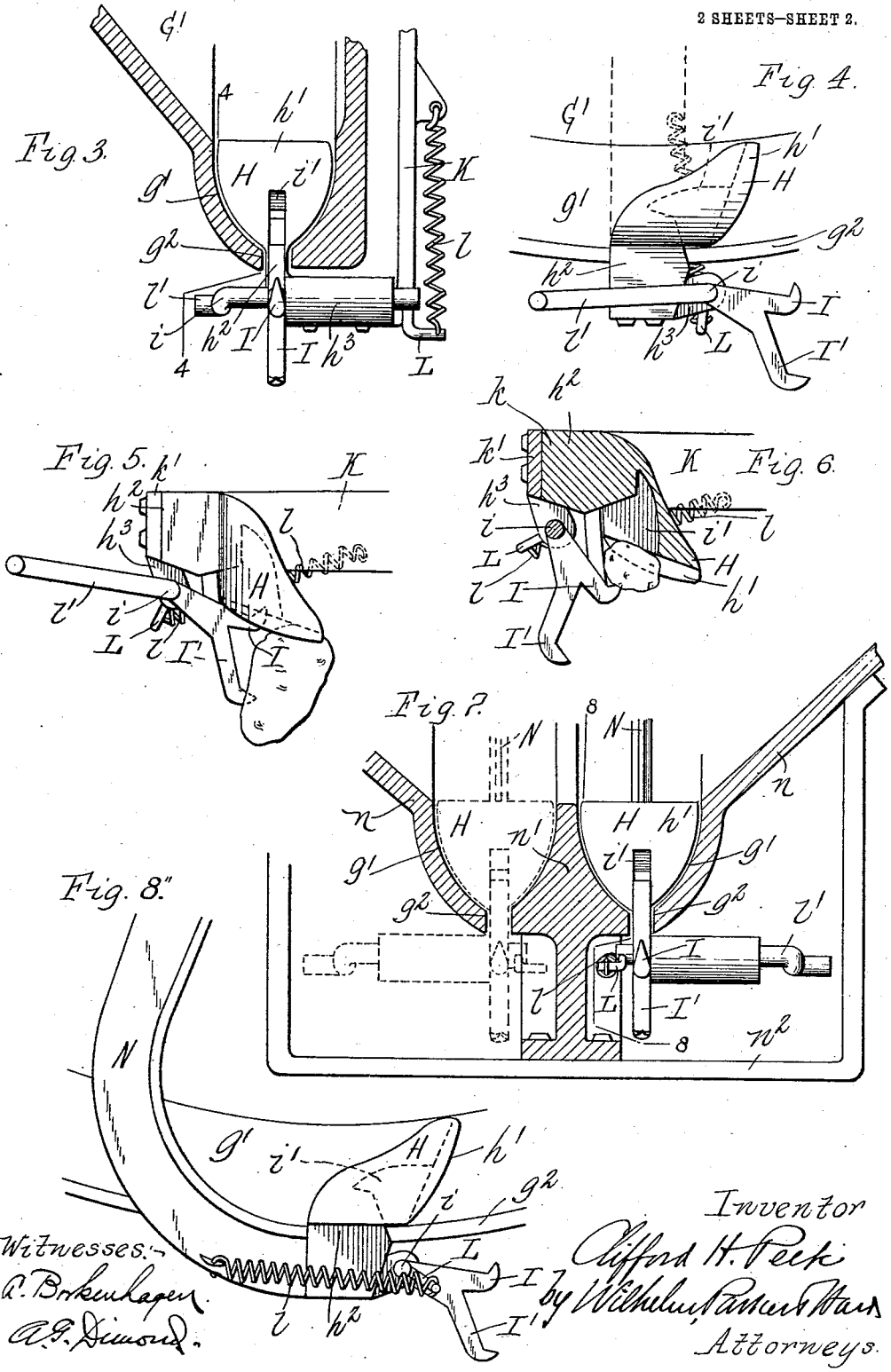

UNITED STATES PATENT OFFICE.

CLIFFORD H. PEEK, OF EAST AURORA, NEW YORK.

POTATO-PLANTER.

1,065,622.  Specification of Letters Patent.  Patented June 24, 1913.

Application filed February 12, 1913. Serial No. 747,873.

*To all whom it may concern:*

Be it known that I, CLIFFORD H. PEEK, a citizen of the United States, residing at East Aurora, in the county of Erie and State of New York, have invented a new and useful Improvement in Potato-Planters, of which the following is a specification.

This invention relates to potato planters of the kind having a receptacle or hopper for potatoes and traveling gripping devices which pass through the receptacle and pick up and carry the potatoes from the receptacle or hopper and drop them one at a time to the ground for planting.

Potato planters of this kind, as heretofore constructed, are open to the objections that the gripping devices frequently pass through the potato receptacle or hopper without getting a potato and consequently plant the potatoes irregularly, also that the gripping devices sometimes seize two or more potatoes at a time and thereby waste the seed. These objections are particularly noticeable when the potatoes supplied to the planter vary in size.

The objects of this invention are to provide a potato planter with gripping devices which are reliable in their operation, even when the potatoes to be planted vary considerably in size, and which will not fail to take a potato when passing through the hopper or receptacle, and will not take more than one potato at a time; also to improve the construction of the potato receptacle or hopper in such a manner as to insure the proper feeding of the potatoes to the part of the hopper through which the gripping devices pass; also to improve the construction of potato planters of this kind in the respects hereinafter specified.

Figure 1:
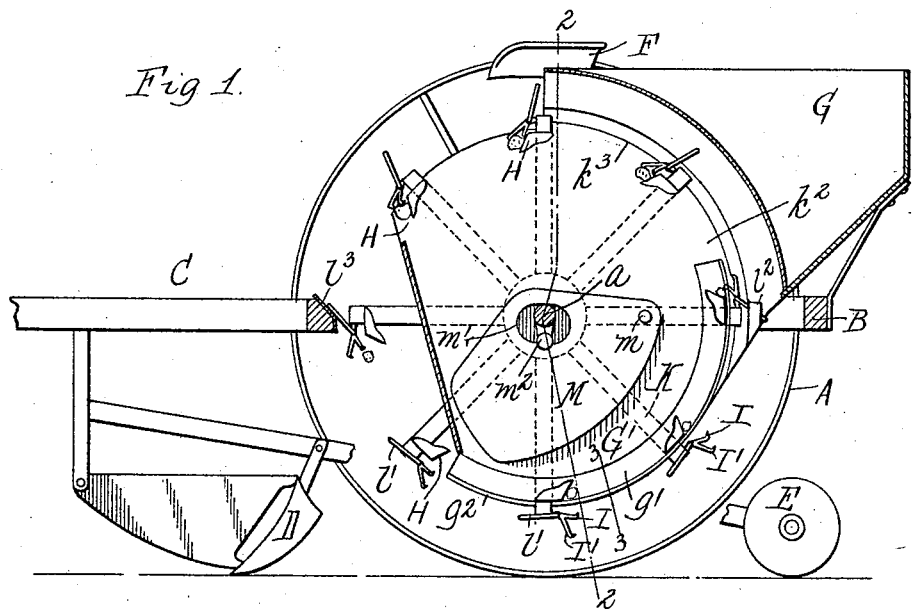
Figure 2:
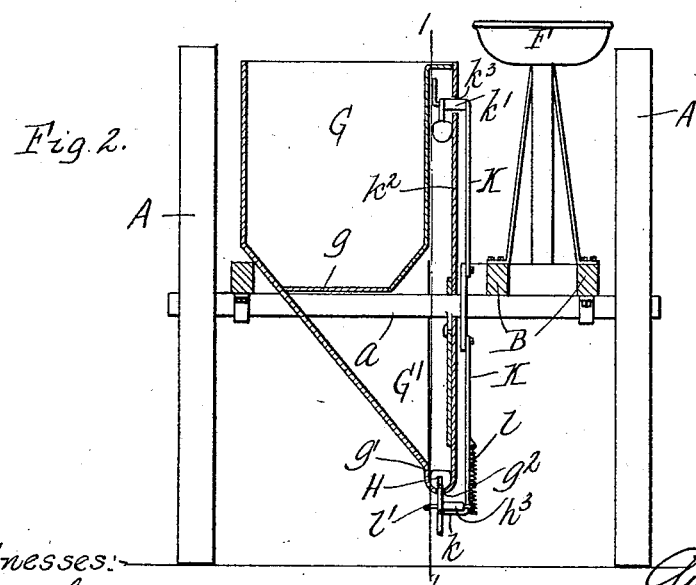

In the accompanying drawings consisting of two sheets: Figure 1 is a longitudinal sectional elevation of a potato planter embodying the invention, on line 1—1, Fig. 2. Fig. 2 is a transverse sectional elevation thereof on line 2—2, Fig. 1. Fig. 3 is a sectional elevation thereof on an enlarged scale on line 3—3, Fig. 1. Fig. 4 is a sectional elevation on line 4—4, Fig. 3, showing one of the gripping devices in elevation. Fig. 5 is a similar view showing the gripping devices holding a large potato and in the position in which the potato is about to be dropped. Fig. 6 is a central sectional elevation of a gripping device showing a small potato held thereby. Fig. 7 is a sectional elevation, similar to Fig. 3, of a planter of modified construction. Fig. 8 is a sectional elevation thereof on line 8—8, Fig. 7.

Like reference characters refer to like parts in the several figures.

A represents the ground wheels on which the planter is mounted and which are rigidly secured to a shaft or axle $a$; B the frame of the planter, in which the axle is journaled; C the tongue, which is preferably secured rigidly to the frame B; D a furrowing plow; E a plow or coverer for closing the furrow; and F a seat for the driver or operator. These parts may be of any suitable or usual construction and of themselves constitute no part of this invention.

The hopper which contains the potatoes to be planted may also be of any desired construction, but is preferably constructed as follows: It comprises an upper compartment or receptacle G, which may be filled with potatoes, and a lower compartment G′, which is separated from the upper receptacle by a gate $g$, which may be opened by the operator from time to time to admit potatoes from the upper to the lower compartment. The upper forward portion of the lower compartment is left open so that the operator can see that this compartment at all times contains the proper quantity of potatoes. The side walls of the lower compartment converge downwardly for the purpose of feeding the potatoes to a trough $g'$ which is formed in the lower compartment, substantially concentric with the axle $a$ and which has a narrow longitudinal slot $g^2$ in its outer or under side, the purpose of which will be hereinafter explained.

The potatoes are picked up out of the trough in the lower compartment and carried to the front of the planter and dropped into the furrow by means of gripping devices which are adapted to enter the open front end of the trough and travel through the same, and each of which comprises a jaw preferably in the form of a scoop or pusher H and a coöperating jaw preferably consisting of two arms I I′ which are movable relatively to the scoop and are adapted to coöperate therewith to hold a potato between the arms and the scoop.

Each of the scoops H shown has a concave face or side $h'$ which faces the direction of movement of the gripping devices and is so inclined with regard to the base of the trough as to form therewith a V-shaped pocket, which together with the concavity of the face $h'$ holds the potatoes within the scoop as the same moves through the trough. The scoops are shaped to conform substantially with the cross section of the trough and to permit them to freely move lengthwise in the trough. Each of the scoops is provided with a neck or reduced portion $h^2$ which extends through the slot $g^2$ and has a lug $h^3$ at its outer portion to which the arms I I' are pivoted, as by a pin $i$. These arms I I', of which two are shown in the drawings, may be formed in a single piece, as shown, and are adapted to extend through the slot $g^2$ in the trough and are made of different lengths and arranged one in advance of the other, the shorter arm being adapted to enter the slot $g^2$ in advance of the other. If there is no small potato or part of a potato in the pocket between the scoop and the trough in the path of movement of the short arm, then this arm enters a recess $i'$ formed in the scoop and permits the longer arm to enter the trough to engage a larger potato.

Any suitable means may be employed for moving the gripping devices through the trough to receive the potatoes and carry them to the point at which they are dropped into the furrow, the scoop being, in the construction shown, secured by laterally extending portions $k$ of their necks to extensions $k'$ of arms K which are rigidly secured to the axle $a$ and rotate therewith. The gripping devices after passing through the trough enter into a space between the outer wall of the upper compartment of the hopper and an extension $k^2$ of one of the side walls of the lower compartment, which is provided with a slot $k^3$, through which the extensions $k'$ of the arms K pass. The gripping devices pass from this space to the front of the planter, where they are opened to discharge the potatoes, as will be hereinafter described, and then back into the trough through the open front end thereof.

For moving the gripping arms I I' toward and from the scoops to grasp and release the potatoes the pivot pin $i$ of the arms is provided at one end with a crank arm L, which is connected by a coil spring $l$ to the arm K. The crank and spring are so located relatively to each other that the spring holds the gripping arms in the open position when the crank is at one side of its dead center position and moves the arms toward and holds them in the potato engaging position when the crank is moved to the other side of its dead center position. The gripping arms are moved to one or the other side of the dead center position by a crank arm $l'$ at the other end of the pivot pin. The crank arm is adapted to engage with stationary tracks $l^2$ and $l^3$ which are so shaped as to cause the gripping arms to be moved respectively into and out of engagement with the potatoes in the scoops. Other means for moving the holding arms into and out of their engaging positions may be employed.

The gripping devices above described are very reliable in their action and enable the planter to be used with potatoes of different sizes. If a small potato is picked up by the scoop, as shown in Fig. 6, the shorter arm I engages the same and the longer arm remains outside of the trough. If a larger potato is picked up by the scoop, so that the shorter arm passes by the same, then the longer arm will engage the potato while the shorter arm enters the recess $i'$ in the scoop, as shown in Fig. 5. By using two holding arms and placing the shorter one in advance of the longer one it is practically impossible to retain more than one potato in the scoop, as might be done if the longer arm alone were used. On the other hand, if the short holding arm alone were used, then large potatoes would not be retained on the scoop. Any potatoes lying on the scoop and not held by the gripping arms will be dropped off into the lower hopper after the gripping device leaves the trough.

It has been found in planters of this kind that the potatoes in a hopper with converging sides would sometimes form an arch or bridge which would prevent the feeding of potatoes to the trough. This can be avoided, as shown in Figs. 1 and 2, by means of an oscillating plate M which is pivoted at $m$ at the side of the hopper and which has a hole $m'$ through which the axle of the planter extends. The axle is provided with an eccentric $m^2$ which engages the edges of the hole and causes the plate to swing back and forth on its pivot. This movement of the plate prevents the forming of an arch by the potatoes and insures the uniform feeding of the potatoes to the trough.

In the construction shown in Figs. 7 and 8 the base of the lower hopper is provided with two troughs through which the gripping devices are moved by means of arms N which pass through the hoppers. The holders and the scoops are constructed in the same manner as shown in Figs. 1–6. In this construction no oscillating plate is required, the alternate arms being arranged to move through different troughs, so that the potatoes are continually agitated. In this construction the outer walls $n\ n$ of the two troughs are formed by the outer edges of the sides of the hopper, while the inner walls are formed by a part $n'$ which is held in place by yokes $n^2$, one of which is shown in Fig. 7.

Two gripping arms are shown in the drawings for every scoop, but more than two arms could be used if desired. The arms could also be independently pivoted on the scoop, instead of being secured together, as shown.

I claim as my invention:

1. In a potato planter, the combination of a hopper having a trough portion, and a device which is adapted to pass through said trough and which comprises a jaw having an inclined part forming a recess with the base of said trough into which the potatoes are caused to enter by the movement of said jaw through the trough, and means for holding the potatoes on said jaw, substantially as set forth.

2. In a potato planter, the combination of a hopper having inclined sides, and a trough into which the potatoes are directed by said inclined sides, said trough having a longitudinal slot and a device which comprises a jaw which is adapted to pass through said trough and which has an inclined part forming a recess with the base of said trough into which the potatoes are caused to enter by the movement of said jaw through the trough, and means adapted to extend through said slot in the trough to hold said potatoes on said jaw, substantially as set forth.

3. In a potato planter, the combination of a hopper for potatoes, a slot in the wall of said hopper, and a device comprising a jaw which is adapted to move through said hopper adjacent to said slot, and a plurality of holding arms of different lengths which are adapted to extend through said slot and retain a potato on said jaw, the shorter of said arms passing through the slot in advance of the longer arms, substantially as set forth.

4. In a potato planter, the combination of a hopper for potatoes, a slot in the wall of said hopper, a device comprising a jaw which is adapted to move through said hopper adjacent to said slot, and a plurality of holding arms of different lengths which are adapted to extend through said slot and retain a potato on said jaw, the shorter of said arms passing through the slot in advance of the longer arms, and a connection between said arms to prevent a succeeding arm from entering the slot after one of said arms has engaged a potato, substantially as set forth.

5. In a potato planter, the combination of a hopper for potatoes, a device comprising a jaw adapted to pass through said hopper into engagement with the potatoes, and a plurality of holding arms pivoted on said jaw and adapted to be moved toward said jaw one in advance of the other for holding the potatoes in place therein, and a connection between said arms to prevent the movement of succeeding arms toward the member after one of said arms engages a potato, substantially as set forth.

6. In a potato planter, the combination of a hopper for potatoes, a jaw adapted to move through said hopper adjacent to the outer wall thereof, a slot in said wall adjacent to the path of movement of said jaw, said jaw having a part extending outwardly through said slot, a holding arm pivoted on said extending part of said jaw, and adapted to swing through said slot to hold a potato on said jaw, a spring connected to said arm and arranged relatively thereto so that the spring will hold the arm in an open position at one side of a dead center position and will move the arm to and hold the same in its engaging position at the opposite side of its dead center position, and means for moving the arm past its dead center position, substantially as set forth.

7. In a potato planter, the combination of a hopper for potatoes, a device comprising a jaw which is adapted to move through said hopper and which has an extending portion, and a second jaw pivoted on said extending portion and movable relatively to said first mentioned jaw, a crank pin on said second jaw, a spring connected to said crank pin, said spring being adapted to hold said second jaw in its open position at one side of the dead center position of said crank pin and to move said jaw to and hold it in its engaging position at the other side of the dead center position of the crank pin, and means for moving said crank pin to either side of said dead center position, substantially as set forth.

8. In a potato planter, the combination of a hopper for potatoes, a device comprising a jaw which is adapted to move through said hopper and which has an extending portion, and a second jaw pivoted on said extending portion and movable relatively to said first mentioned jaw, a crank pin on said second jaw, a spring connected to said crank pin, said spring being adapted to hold said second jaw in its open position at one side of the dead center position of said crank pin and to move said jaw to and hold it in its engaging position at the other side of the dead center position of the crank pin, an arm on said second jaw, and stationary means adapted to coöperate with said arm to move the jaw to either side of its dead center position, substantially as set forth.

9. In a potato planter, the combination of a hopper, a plate pivoted at one side of the hopper, and means for swinging the plate back and forth on its pivot, substantially as set forth.

10. In a potato planter, the combination of a hopper, a rotatable axle extending through the hopper, a plate movably secured to one side of the hopper, and a connection between said axle and said plate for imparting a reciprocatory movement to the plate, substantially as set forth.

11. In a potato planter, the combination of a hopper, and a device which is adapted to pass through said hopper and which comprises a jaw having an inclined part forming a recess with the base of said hopper into which the potatoes are caused to enter by the movement of said jaw through the hopper, and means for holding the potatoes on said jaw, substantially as set forth.

12. In a potato planter, the combination of a hopper for potatoes, a device comprising a jaw adapted to pass through said hopper into engagement with the potatoes, and a plurality of holding arms pivoted on said jaw and adapted to be moved toward said jaw one in advance of the other for holding the potatoes in place therein, substantially as set forth.

13. In a potato planter, the combination of a hopper for potatoes, a slot in the wall of said hopper, a device comprising a jaw which is adapted to move through said hopper adjacent to said slot, and a plurality of holding arms of different lengths which are adapted to be moved through said slot toward said jaw one in advance of the other for holding the potatoes in place therein, substantially as set forth.

14. In a potato planter, the combination of a hopper and a device which is adapted to pass through said hopper and which comprises a jaw having an inclined part forming a recess with the base of said hopper into which the potatoes are caused to enter by the movement of said jaw through the hopper, and a plurality of holding arms of different lengths pivoted on said jaw and adapted to be moved toward said jaw one in advance of the other for holding the potatoes in place therein, substantially as set forth.

Witness my hand this 5th day of February, 1913.

CLIFFORD H. PEEK.

Witnesses:
F. E. PROEHNOW,
A. L. McGEE.

---

Copies of this patent may be obtained for five cents each, by addressing the "Commissioner of Patents, Washington, D. C."